Jan. 19, 1943.  C. SAURER  2,308,964
SEAT CUSHION
Filed Nov. 1, 1940
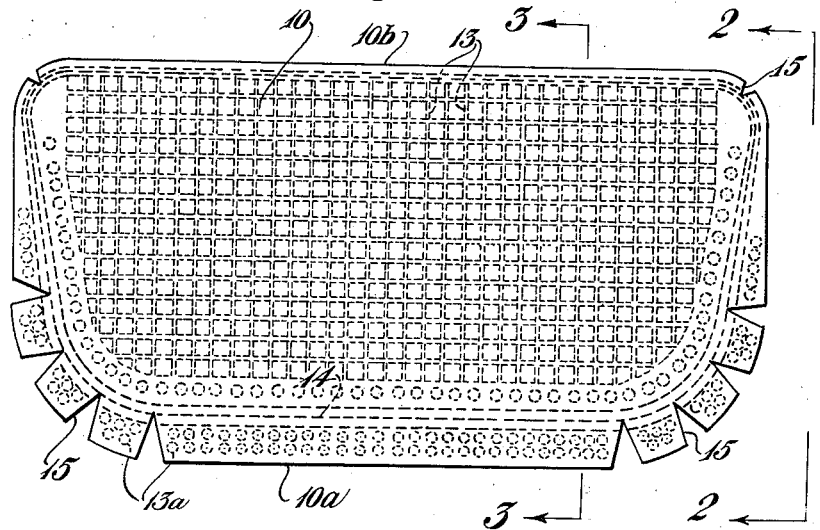
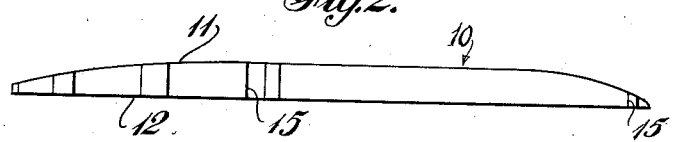
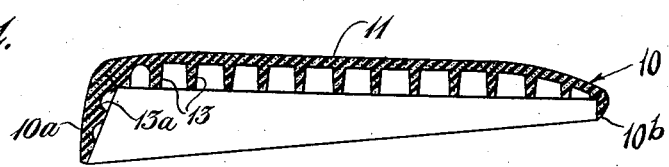
INVENTOR
Curt Saurer
BY
ATTORNEYS Patented Jan. 19, 1943

2,308,964

UNITED STATES PATENT OFFICE 2,308,964

SEAT CUSHION

Curt Saurer, Akron, Ohio, assignor to The Firestone Tire & Rubber Company, Akron, Ohio, a corporation of Ohio Application November 1, 1940, Serial No. 363,843

2 Claims. (Cl. 155—179)

This invention relates to seat cushions, especially to cellular rubber seat cushions having beaded edges.

The general object of the present invention is to provide an improved, easily constructed cellular rubber seat cushion having beaded edges.

Another object of the invention is to simplify the manufacture of beaded edge cellular rubber seat cushions.

The foregoing and other objects will be manifest from the following specification, with particular reference to the accompanying drawing, of which:

Figure 1 is a plan of a seat cushion embodying the invention;

Figure 2 is an enlarged side elevation as viewed from the line 2—2 of Figure 1;

Figure 3 is an enlarged vertical sectional view on line 3—3 of Figure 1; and

Figure 4 is a vertical sectional elevation of the seat cushion of the invention with the beaded edges thereof turned down with relation to the remainder of the cushion.

Referring to the drawing, Figure 1 shows a cellular rubber seat cushion 10 which is relatively thin, and which is substantially rectangular in form. The cushion 10 has an upper, or load carrying, surface 11, and a lower surface 12 which is substantially flat and is adapted to engage with means for carrying the cushion 10. The lower surface 12 of the cushion may be provided with a plurality of recesses 13 extending thereinto in order to reduce the volume of cellular rubber required to form the cushion 10. Note that the recesses 13a formed adjacent the edges of the cushion are circular in section, whereas the remaining recesses formed in the cushion are substantially square in section. This provides maximum rubber at the edges of the cushion where the greatest support is required. Obviously other types, or no, recesses could be formed in the surface 12 in other embodiments of the invention.

An especial feature of the present invention is the formation of grooves or recesses 14 in the under surface of the cushion 10 adjacent the edges thereof. The recesses 14 are of inverted V shape and extend substantially around the cushion, being appreciably deeper at an edge 10a of the cushion than at the opposite edge 10b so that the edge 10a can be used as the front edge of the cushion, as will hereinafter be explained. The recesses 14 in the cushion 10 adapt the cushion to have its edge portions bent downwardly with relation to the center portion of the cushion so that beads are formed around the edges of the cushion, as indicated in Figure 4. The bending down of the edge portions of the cushion 10 is facilitated by forming a plurality of wedge shaped indentations 15 in the edges of the cushion 10. The bases of the indentations 15 are at the outer edges of the cushion 10, and the latter may be formed by cutting out portions of the cushion. Preferably both the recesses 13, 13a and 14 and the indentations 15 are initially molded into the cushion, which is produced with the edges thereof in alignment with the center portion thereof whereby the cushion can be molded in a flat mold but be adapted to have the edges thereof bent over with relation to the center portion of the cushion. Molding the recesses 14 and indentations 15 in the cushion enables the cushion to be formed from a minimum of material. Figure 4 shows that the edges of the cushion can be bent donwardly without damaging or stretching any portion of the cushion excessively. Only a small area of the cushion adjacent the apex of the recesses 14 is stressed slightly by bending over the edges of the cushion. If desired, the surfaces of the recesses 14 can be coated with a cement while the cushion is stretched out substantially flat. Then the edges of the cushion can be bent over and the cement will serve to retain the beads thereof in place. Otherwise an external force must be exerted upon the beads of the cushion to retain them out of alignment with the main portion of the cushion 10.

From the foregoing it will be seen that an easily manufactured, inexpensive beaded seat cushion is provided by the invention. The beaded edge 10a should be used as the front edge of the cushion 10, since it is thicker than the other edges, hence adapted to stand greatest load. In some cases, a beaded edge may be formed only at the front edge, or the front and side edges of a cushion while the indentations 15 are not required in all embodiments of the invention.

While an embodiment of the invention has been completely illustrated and described herein, it will be appreciated that modifications thereof may be made without departing from the scope of the invention, as defined in the appended claims.

What is claimed is:

1. A cellular rubber cushion comprising a section of cellular rubber having an upper and a lower surface with recesses extending into its lower surface, said recesses being substantially square in the center portion of said section and being cylindrical at the edges thereof, said section having a substantially inverted V-shape recess formed in its lower surface and extending substantially around the section adjacent the edges thereof whereby the edge portions of the section are readily bent over with relation to the remainder thereof.

2. A cellular rubber cushion comprising a section of cellular rubber having an upper and a lower surface with recesses extending into said lower surface, said recesses being substantially square in the center portion of said section and being cylindrical at the edges thereof, the edge portions of said section having substantially wedge-shaped indentations formed therein at the corners thereof with the bases of the indentations being at the edges of the cushion, said section having a substantially inverted V-shape recess formed in its lower surface and extending substantially around the section adjacent the edges thereof, whereby the edge portions of the section are readily bent over with relation to the remainder thereof.

CURT SAURER.